US009935926B2

(12) United States Patent
Borland et al.

(10) Patent No.: US 9,935,926 B2
(45) Date of Patent: *Apr. 3, 2018

(54) METHODS AND APPARATUS TO IDENTIFY MEDIA DISTRIBUTED VIA A NETWORK

(71) Applicant: The Nielsen Company (US), LLC, New York, NY (US)

(72) Inventors: Robert P. Borland, Palm Harbor, FL (US); Jonathon Brett Rubin, Belleair, FL (US); Anthony B. Stringer, Oldsmar, FL (US); Adam Schenker, Tampa, FL (US); Shailendra Paranjape, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,454

(22) Filed: Oct. 21, 2016

(65) Prior Publication Data

US 2017/0041301 A1    Feb. 9, 2017

Related U.S. Application Data

(63) Continuation of application No. 14/512,143, filed on Oct. 10, 2014, now Pat. No. 9,516,001.
(Continued)

(51) Int. Cl.
*G06F 21/00* (2013.01)
*H04L 29/06* (2006.01)

(52) U.S. Cl.
CPC ...... *H04L 63/0485* (2013.01); *H04L 63/0457* (2013.01); *H04L 63/0853* (2013.01); *H04L 2463/103* (2013.01)

(58) Field of Classification Search
CPC .................................................. H04L 63/1408
See application file for complete search history.

(56) References Cited

U.S. PATENT DOCUMENTS 5,870,559 A    2/1999  Leshem et al.
6,182,097 B1   1/2001  Hansen et al.
(Continued)

OTHER PUBLICATIONS

International Searching Authority, "International Search Report & Written Opinion", issued in connection with International Application No. PCT/US2014/068077, dated Jun. 3, 2015, 10 pages.
(Continued)

*Primary Examiner* — William Powers
(74) *Attorney, Agent, or Firm* — Hanley, Flight, & Zimmerman, LLC

(57) ABSTRACT

Methods, apparatus, systems and articles of manufacture to monitor media presentations are disclosed. An example method includes extracting first network packet parameters from a first network packet received at a media device when retrieving a first encrypted web page, storing the first network packet parameters in association with identifying information for the first encrypted web page, extracting second network packet parameters from a second network packet received at the media device from an unknown encrypted web page, when the extension does not collect identifying information for the unknown encrypted web page, comparing the second network packet parameters to the first network packet parameters, and identifying the unknown encrypted web page as the first encrypted web page when the comparison of the second network packet parameters to the first network packet parameters has a similarity above a threshold.

21 Claims, 6 Drawing Sheets

Related U.S. Application Data

(60) Provisional application No. 62/058,055, filed on Sep. 30, 2014.

(56) References Cited

U.S. PATENT DOCUMENTS

| | | | |
|---|---|---|---|
| 6,341,310 | B1 | 1/2002 | Leshem et al. |
| 6,470,383 | B1 | 10/2002 | Leshem et al. |
| 7,594,011 | B2 | 9/2009 | Chandra |
| 8,200,962 | B1 | 6/2012 | Boodman et al. |
| 8,667,480 | B1 * | 3/2014 | Sigurdsson ............... G06F 8/65 717/168 |
| 8,726,005 | B2 | 5/2014 | Stavrou et al. |
| 8,990,697 | B2 * | 3/2015 | Patel ........................ G06F 3/048 715/738 |
| 2004/0104807 | A1 | 6/2004 | Ko |
| 2009/0305680 | A1 * | 12/2009 | Swift ..................... H04L 43/00 455/414.1 |
| 2009/0307084 | A1 | 12/2009 | Monighetti et al. |
| 2010/0199169 | A1 | 8/2010 | Gnech et al. |
| 2012/0240019 | A1 | 9/2012 | Nuzzi |
| 2013/0014137 | A1 | 1/2013 | Bhatia et al. |
| 2014/0068411 | A1 | 3/2014 | Ross et al. |
| 2015/0067853 | A1 * | 3/2015 | Amrutkar ............... H04L 63/14 726/23 |

OTHER PUBLICATIONS

United States Patent and Trademark Office, "Non-Final Office Action," issued in connection with U.S. Appl. No. 14/512,143 dated Jan. 4, 2016, 32 pages.

United States Patent and Trademark Office, "Notice of Allowance," issued in connection with U.S. Appl. No. 14/512,143 dated Dec. 27, 2016, 12 pages.

Patent Cooperation Treaty, "International Preliminary Report on Patentability," issued in connection with application No. PCT/US2014/068077, dated Apr. 3, 2017, 8 pages.

* cited by examiner

| | URL | Time | Source | Destination | Length |
|---|---|---|---|---|---|
| 302 | Testurl1.com | 122 | rtr.xyz.samplecdn.com.https | 192.168.1.5.49952 | 175 |
| 304 | Testurl1.com | 128 | 192.168.1.5.49952 | ecp.abc.samplecdn.com.https | 400 |
| 306 | Testurl1.com | 118 | edge.testurl1.com.https | 192.168.1.5.49595 | 126 |
| 308 | Testurl2.com | 985 | ptr.frc1.hostingservice123.com.https | 192.168.1.5.49595 | 1448 |
| 310 | Testurl3.com | 33 | deploy.server789.com.https | 192.168.1.5.49593 | 1000 |

METHODS AND APPARATUS TO IDENTIFY MEDIA DISTRIBUTED VIA A NETWORK

RELATED APPLICATIONS

This patent arises from a continuation of U.S. patent application Ser. No. 14/512,143, filed Oct. 10, 2014, entitled "METHODS AND APPARATUS TO IDENTIFY MEDIA DISTRIBUTED VIA A NETWORK," which claims the benefit of U.S. Provisional Patent Application Ser. No. 62/058,055, filed Sep. 30, 2014. U.S. patent application Ser. No. 14/512,143 and U.S. Provisional Patent Application Ser. No. 62/058,055 are hereby incorporated by reference in their entirety.

FIELD OF THE DISCLOSURE

This disclosure relates generally to audience measurement, and, more particularly, to methods and apparatus to monitor media presentations.

BACKGROUND

Media providers and/or other entities such as, for example, advertising companies, broadcast networks, etc. are often interested in the viewing, listening, and/or media behavior of audience members and/or the public in general. To monitor this behavior, an audience measurement company may enlist panelists (e.g., persons agreeing to be monitored) to cooperate in an audience measurement study. The media usage and/or exposure habits of these panelists as well as demographic data about the panelists is collected and used to statistically determine the size and demographics of a larger audience of interest.

In recent years, security of online communications has increased in importance due to privacy concerns, financial data concerns, etc. One method of providing security to online transactions is the use of encryption. In particular, encrypted online communication protocols (e.g., hypertext transport secure (HTTPS)) have grown in popularity. Such protocols provide end-to-end encryption to prevent a third party from intercepting and observing the contents of communications.

To monitor encrypted media communications, audience measurement entities often employ tools that interact with media presentation applications that reveal information about the media. For example, an extension may be added to a web browser to gather information about webpages and/or other media and to report the gathered information to a panelist meter executing on the same media presentation device (e.g., computer) as the web browser. Because the extension executes within the browser, the extension has access to the decrypted contents of encrypted media (e.g., media transferred using HTTPS).

BRIEF DESCRIPTION OF THE DRAWINGS

FIG. 3 is a table illustrating example network data that may be analyzed by the example system of FIG. 1.

The figures are not to scale. Wherever possible, the same reference numbers will be used throughout the drawing(s) and accompanying written description to refer to the same or like parts.

DETAILED DESCRIPTION

Figure 1:
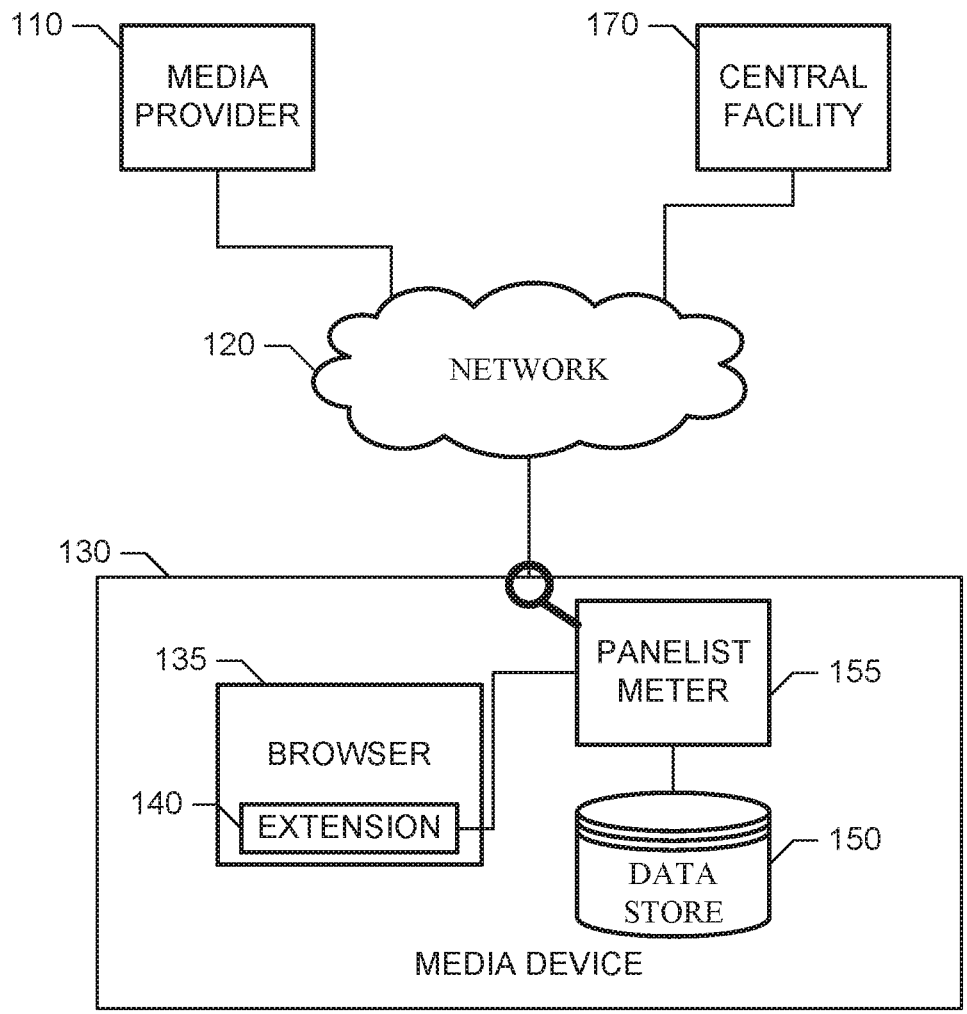
FIG. 1 is a block diagram of an example system constructed in accordance with the teachings of this disclosure to monitor media presentations and shown in an example environment of use.

Media monitoring using browser extensions can provide reliable results, but browser extension operation is subject to interruption. For example, a browser extension may become inoperative following an update of the browser extension, may be disabled by security software, may be accidently disabled by a user, etc. Methods and apparatus disclosed herein facilitate monitoring of online media that may be used when a browser extension becomes inoperative or is otherwise unavailable.

As used herein, the term "media" includes any type of content and/or advertisement delivered via any type of distribution medium. Thus media includes television programming and/or advertisements, radio programming and/or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In some examples, media monitoring information is aggregated by media identity to determine usage of the media, exposure of the media, etc. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

FIG. 1 is a block diagram of an example system constructed in accordance with the teachings of this disclosure to monitor media shown operating in connection with an example network in an example environment of use. The example system of FIG. 1 includes a panelist meter 155 executing on a media device 130 and a central facility 170. The media device 130 of the illustrated example includes a web browser 135 and a media device data store 150. The example web browser 135 of the illustrated example communicates via a network 120 to retrieve media from a media provider 110. According to the illustrated example, the central facility 170 is associated with an audience measurement entity that is independent and not associated with media providers (e.g., the example media provider 110). Alternatively, the central facility 170 may be associated with and/or combined with the media provider 110 and/or may be associated with any other entity (e.g., another entity interested in collecting media monitoring information).

The example media provider 110 of the illustrated example of FIG. 1 includes one or more servers providing Internet media (e.g., web pages, audio, video, images, etc.). The example media provider 110 of FIG. 1 may be implemented by any provider(s) of media such as a digital media broadcaster, a multicaster, a unicaster (e.g., a cable television service, a fiber-optic television service, an IPTV provider, etc.), an on-demand digital media provider (e.g., an Internet streaming video and/or audio service such as Netflix®, YouTube®, Hulu®, Pandora®, Last.fm®, etc.), a web page (e.g., an online store such as Amazon.com®), and/or any other provider and/or creator of media. Additionally or alternatively, the example media provider 110 may not be an Internet provider. For example, the media provider may be on a private, a virtual private, and/or semi-private network (e.g., a LAN).

The example network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example network 120 of FIG. 1.

The example media device 130 of the illustrated example shown in FIG. 1 is a device that retrieves media from the media provider 110 for presentation. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a personal computer such as a laptop computer, and thus, is capable of directly presenting media (e.g., via an integrated and/or connected display and speakers). While in the illustrated example, a personal computer is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The web browser 135 of the illustrated example of FIG. 1 is an application that requests, receives, and presents media (e.g., webpages). For example, the web browser 135 of the illustrated example downloads media from the example media provider 110 via the example network 120. The example web browser 135 of the illustrated example is instrumented to include monitoring functionality via a browser extension 140 provided by the monitoring entity via (e.g., the monitoring entity hosting the central facility 170). While the web browser 135 of the example of FIG. 1, any other type of application that may retrieve and/or present media may be utilized.

The media device data store 150 of the illustrated example stores metering information collected by the panelist meter 155. The example media device data store 150 of the illustrated example of FIG. 1 may be any device for storing data such as, for example, flash memory, magnetic media, optical media, etc. In the illustrated example, the media device data store 150 is random access memory of the media device 130. Furthermore, the data stored in the media device data store 150 may be in any data format such as, for example, binary data, comma delimited data, tab delimited data, structured query language (SQL) structures, etc. While in the illustrated example the media device data store 150 is illustrated as a single database, the media device data store 150 may be implemented by multiple databases (e.g., distributed in two or more devices), and/or be stored in multiple memory locations of the media device.

The example central facility 170 of FIG. 1 provides the panelist meter 155 (including the extension 140) to the media device 130. During installation and/or registration of the panelist meter 155 on the media device 130, the central facility 170 receive user identifying information (e.g., demographic information for a user(s) of the media device 130). Additionally, the central facility 170 receives metering information collected by a plurality of the panelist meters 155 operating on a plurality of media devices 130. The central facility 170 aggregates the collected metering information to generate reports regarding exposure to the media. For example, the central facility 170 of this example compiles media exposure metrics based on the correlation of the metering information and the user-identifying information. A report is then generated to indicate media exposure, audience size, and/or audience characteristics (e.g., demographics). In some examples, the exposure measurements provide ratings information for different media (e.g., a particular website, a particular video, etc.) In some examples, the exposure measurements indicate ratings information and/or usage statistics for different media provided by the media provider 110 and/or a plurality of media providers 110. The example central facility 170 of FIG. 1 is associated with a neutral audience measurement entity that ensures that validity and integrity of the exposure metrics. Alternatively, the central facility 170 may be associated with any other entity.

The example panelist meter 155 of the illustrated example of FIG. 1 is implemented by a processor executing instructions, but it could alternatively be implemented by an ASIC, DSP, FPGA, or other circuitry (e.g., a dedicated circuit). For example, the panelist meter 155 may be a component built into the media device 130, a component communicatively coupled to the media device 130, etc. The panelist meter 155 may be implemented by adding the functionality disclosed herein to an existing panelist meter (e.g., the NetSight panelist meter software from The Nielsen Company (US), LLC). In the illustrated example, the panelist meter 155 is downloaded to the media device 130 from the central facility 170 and/or another server of the audience measurement entity. In the illustrated example, the extension 140 is installed in conjunction with the installation of the panelist meter 155. Alternatively, the panelist meter 155 and/or the extension 140 may be delivered to and/or installed in the media device 130 in any other manner. The panelists are users registered on panels maintained by a ratings entity (e.g., an audience measurement company) that owns and/or operates the ratings entity subsystem. Alternatively, the panelist meter 155 may be installed on computing devices from other types of panelists and/or any other type of user.

The example panelist meter 155 cooperates with the extension 140 to meter media presentation at the media device 130. The example extension 140 collects information from media presented by the web browser 135 (e.g., media retrieved from the media provider 110) and transmits the information to the panelist meter 155. The extension 140 of the example of FIG. 1 collects a uniform resource locator (URL) (e.g., from page information reported by the web browser 135) for media presented in the example web browser 135. Alternatively, the extension 140 may collect any other identifying information or other types of information. For example, the extension 140 may determine (e.g., extract, transform, derive, decode, convert, etc.) media-identifying metadata (e.g., such as media identifying information, source identifying information, a watermark, a code, etc.) associated with, and/or transmitted with the media (e.g., in an ID3 tag, in a Hypertext Transfer Protocol (HTTP) Live Streaming (HLS) manifest, in a Moving Pictures Experts Group version 2 (MPEG2) transport stream, in a Moving Pictures Experts Group version 4 (MPEG4) transport stream, in a timed text track, in an encryption key associated with the media, etc.). The media-identifying metadata may be a code in, for example, a text or binary format located in an ID3 tag associated with the media. In some examples, the extension 140 converts the information into a text and/or binary format for transmission to the panelist meter 155.

U.S. patent application Ser. No. 13/828,971, entitled "SYSTEMS AND METHODS FOR IDENTIFYING A USER OF AN ELECTRONIC DEVICE," and U.S. patent application Ser. No. 14/489,390, entitled "METHODS AND APPARATUS TO MONITOR MEDIA PRESENTATIONS" disclose methods and apparatus to obtain user consent for monitoring and collect monitoring information. U.S. patent application Ser. No. 13/828,971 and U.S. patent application Ser. No. 14/489,390 are incorporated by reference herein in their entirety.

The example extension 140 of FIG. 1 is included within the web browser 135 to allow the extension 140 to access media presented by the browser. For example, when media is encrypted during transmission (e.g., a web page transmitted using HTTPS), the example extension 140 has access to the media after it is decrypted by the web browser 135 but the example panelist meter 155 does not have access to the unencrypted media. While the example extension 140 is installed within the web browser 135 the extension 140 or another component may be installed or located in another place that enables access to the media (e.g., unencrypted media). For example, the web browser 135 could be configured to share the unencrypted media with the panelist meter 155, the media device could be configured to share the unencrypted media with the panelist meter 155, the extension could be located in the media device 130 or another network component in a manner that provides access to the unencrypted media (e.g., using man-in-the-middle interception), etc.

The example panelist meter 155 of FIG. 1 records the information collected by the extension 140 to meter presentation of the media. According to the illustrated example, the panelist meter 155 stores collected information in the data store 150 until such time as the information is transmitted to the central facility 170. Alternatively, the panelist meter 155 could transmit the information to the central facility 170 upon receipt (e.g., as a stream in real time).

In addition to recording and transmitting information collected by the example extension 140, the example panelist meter 155 collects information that enables the panelist meter 155 to identify media in instances when the extension 140 is inoperative or is otherwise unavailable (e.g., when an update to the web browser 135 breaks compatibility with the extension 140). In particular, the example panelist meter 155 collects network data associated with the media presented by the web browser 135 and stores characteristics (e.g., packet parameters such as header information) of the network data in association with the URL collected by the extension 140 (e.g., during times that the extension 140 is operational) to train a reference database. Accordingly, when the extension 140 is not operational, the panelist meter 155 continues to collect the network data (e.g., without assistance from the extension) and compares the network data (e.g., the packet parameters) against the trained reference database in the data store 150 to predict a URL that is associated with the network data.

For example, when media is transmitted using HTTPS, the panelist meter 155 cannot extract the URL for the media from the network data because the network data is encrypted and the panelist meter 155 cannot decrypt the network data to access the payloads of the encrypted network data. However, some information is available from the network data. The example panelist meter 155 determines the amount of time taken to transfer the media (e.g., the duration of the communication from the media provider 110 to the media device 130), a source hostname (e.g., a hostname for a server serving the media, which is often not the same as the hostname of the URL for the media), a destination hostname, and a size of the network data (e.g., a packet size). When training the reference database, the panelist meter 155 stores the collected parameters in the data store 150 in association with the URL received from the example extension 140 (e.g., parameters from all network traffic collected within +/−2 seconds of a URL received from the extension 140 may be associated with the extension 140). Later, when the extension 140 is not available or the URL is otherwise not available, the panelist meter 155 collects the parameters from network data, compares the parameters to the data in the reference database to determine similarity scores, and determines the URL based on the similarity score (e.g., determines the URL to be the URL associated with the reference data that has the best similarity score).

Figure 2:
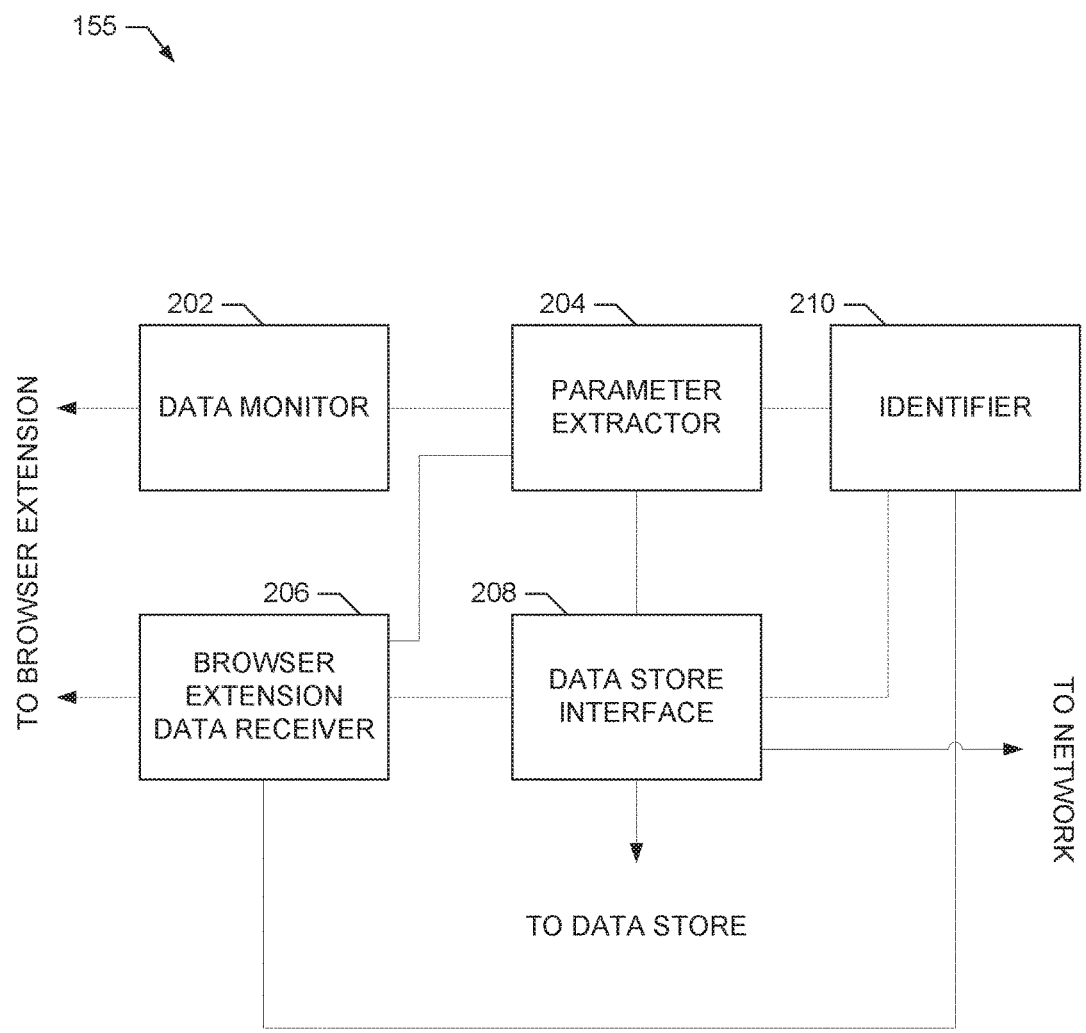
FIG. 2 is a block diagram of an example implementation of the example panelist meter of FIG. 1.

FIG. 2 is a block diagram of an example implementation of the panelist meter 155 of FIG. 1. The example panelist meter 155 of FIG. 2 includes an example data monitor 202, an example fingerprint generator 204, an example browser extension data receiver 206, an example data store interface 208, and an example fingerprint generator 204.

The example data monitor 202 of FIG. 2 monitors network communications at the media device 130 to collect information from network traffic carrying media presented by the example web browser 135 of FIG. 1. For example, the data monitor 202 may operate as a packet sniffer, may operate as a proxy server, may query an application programming interface (API) of an operating system of the media device 130, may communicate with a network element communicatively coupled to the media device 130 (e.g., a router, a switch, a gateway, a firewall, etc.), and/or may obtain network data in any other manner.

The example parameter extractor 204 of the example of FIG. 2 processes the network data to extract information of interest to the panelist meter 155. For example, the example parameter extractor 204 extracts packet header information to determine the following parameters: durations of communications (e.g., by comparing timestamps of packets), destination and source hostnames, and packet sizes. Additionally or alternatively, the parameter extractor 204 may extract any other information contained in a packet (e.g., hardware addresses, checksums, sequence numbers, any transmission control protocol (TCP) parameters, any internet protocol (IP) parameters, any hypertext transport protocol parameters, etc.). In instances where the network data is not encrypted, the parameter extractor 204 may extract additional information about the media (e.g., the URL for the media).

To determine where to send the collected parameters, the example parameter extractor 204 determines if the extension 140 of FIG. 1 is operational within the web browser 135. For example, the parameter extractor 204 of the illustrated example queries the browser extension data receiver 206 to determine if data has been received from the extension 140 (e.g., within a threshold time such as 2 seconds, 4 seconds, 30 seconds, etc. of the network communication monitored by the data monitor 202). When data has not been received from the extension 140 within the threshold period of time, the parameter extractor 204 of the illustrated example determines that the extension 140 is not operational. Alternatively, the parameter extractor 204 may utilize other methods to determine the operational state of the extension 140 (e.g., may query the web browser 135, may query an operating system of the media device 130, etc.).

The example parameter extractor 204 of FIG. 2 selectively transmits the collected parameters to the data store interface 208 or the identifier 210 based on the operational state of the extension 140. According to the illustrated example, when the extension 140 is operational, the example parameter extractor 204 transmits the parameters to the example data store interface 208 for storage in the data store 150 in association with identifying information collected by the extension 140 and received by the browser extension data receiver 206. When the extension 140 is not operational, the example parameter extractor 204 transmits the parameters to the example identifier 210 to predict identifying information associated with the media (as described in further detail below in conjunction with the description of the example identifier 210). Alternatively, the parameter extractor 204 may transmit the parameters to the data store interface 208 and the identifier 210 regardless of the operational state of the extension 140.

The example browser extension data receiver 206 of FIG. 2 receives information collected by the extension 140 of FIG. 1. The example extension 140 of FIG. 1 collects information about web pages presented by the media device 130 and transmits the information to the browser extension data receiver 206. For example, the collected information may be PAGEINFO data. The following illustrates example PAGEINFO data:

```
<PAGEINFO ADDRESSBAR="Y" EVENT="4" H="1313"
RESIZE="U" TYPE="MAIN" W="1610" X="950" Y="75">
<DATE>Tue, 16 Sep 2014 18:41:07.305 GMT-05:00</DATE>
<MODULE PID="364">Safari</MODULE>
<TID>1</TID>
<WID>120</WID>
<URL>https://www.sampleURL.com/</URL>
<TITLE>Welcome to SampleURL - Log In, Sign Up or Learn
More</TITLE>
<NBCHARS>39796</NBCHARS>
<IMAGES_AREA>166667</IMAGES_AREA>
<LASTUSERACTION PID="364">Tue, 16 Sep 2014 18:41:05.843 GMT-
05:00</LASTUSERACTION>
</PAGEINFO>
```

Alternatively, any other format for information may be utilized. For example, the collected information may comprise only a URL, may be web page information collected in another format, etc.

The example browser extension data receiver 206 of FIG. 2 transmits the received information to the data store interface 208. The browser extension data receiver 206 may additionally or alternatively provide information to the parameter extractor 204. For example, the browser extension data receiver 206 may provide information to the parameter extractor 204 to enable the parameter extractor 204 to determine if the extension 140 of FIG. 1 is operational (e.g., a time of last communication with the extension 140, a notification from the extension 140 about its operational state, etc.).

The data store interface 208 of the illustrated example receives information collected by the extension 140 of FIG. 1 via the browser extension data receiver 206 and parameters extracted from network data via the parameter extractor 204. The example data store interface 208 stores the information and parameters in the example data store 150. For example, the example data store interface 208 adds a session record including the parameters to a training record associated with the URL identified in the information from the extension 140 each time that a session is detected in the network data. Alternatively, the information and parameters may be stored and/or associated in any other manner.

Additionally, the example data store interface 208 retrieves stored data from the data store 150 to facilitate prediction of identifying information by the example identifier 210. For example, when the extension 140 is not operational, the identifier 210 compares parameters extracted from network data by the parameter extractor 204 with parameters stored in training records in the data store 150. Once the identifier 210 has predicted the identifying information, the data store interface 208 stores the information in the data store 150 to record the exposure to the associated media.

Periodically and/or aperiodically, the data store interface 208 transmits data stored in the data store 150 to the central facility 170. The example data store interface 208 transmits web page identifying information (e.g., identifying information received from the extension 140 when it is operational and predicted identifying information received from the identifier 210 when the extension 140 is not operational). Alternatively, any other information may be transmitted. For example, the data store interface 208 may transmit the training records containing the parameters extracted by the parameter extractor 204 to enable the central facility 170 to share the parameters with other media devices 130.

The identifier 210 of the illustrated example receives parameters extracted by the parameters extractor 204 (e.g., when the extension 140 is not operational) and analyzes the parameters to predict identifying information (e.g., a URL) for the parameters. The example identifier 210 retrieves training records stored in the data store 150 via the data store interface 208, compares the received parameters to each set of parameters stored in the session records of the training records to determine similarity scores (e.g., a Jaccard similarity coefficient), and aggregates (e.g., averages) the similarity scores to determine a similarity score for each training record. The identifier 210 of the illustrated example determines that the identifying information for the received parameters is the identifying information associated with the training record that had the best similarity score. In some examples, the identifier 210 compares the best similarity score with a threshold to determine if the similarity is sufficient to make a prediction. In such an example, if the similarity score does not meet the threshold, the identifier 210 may determine that identifying information cannot be predicted.

The example identifier 210 of FIG. 2 utilizes a Jaccard similarity coefficient to determine a similarity between a set of received parameters (e.g., a set of parameters comprising a duration, a source hostname, a destination hostname, and a size) with a set of parameters stored in a session record of a training record. The Jaccard similarity coefficient is a statistic for comparing similarity of sets:

$$J(A, B) = \left| \frac{A \cap B}{A \cup B} \right|.$$

Alternatively, the identifier 210 may use any other statistic or method for comparing the similarity or dissimilarity of the received parameters to the records stored in the data store 150 to predict the identifying information associated with the parameters. For example, any type of machine learning classifier could be utilized (e.g., a neural network, a Bayes classifier, a decision tree classifier, k-nearest neighbor classifier, etc.).

After the example identifier 210 has determined identifying information, the identifying information is transmitted to the data store interface 208 for storage in the data store 150 (e.g., to create a record of the exposure to the web page associated with the identifying information).

In some examples, the identifier 210 may additionally compute a similarity score when parameters are added to a training record (e.g., when the extension 140 is operational). For example, the identifier 210 may retrieve the training record for a URL identified in the information received from the extension 140, may compare the received parameters to each session record to compute a set of similarity scores, and may aggregate (e.g., average) the similarity scores to determine a confidence score that may indicate the confidence level of the training record. The confidence level may be stored in the data store 150 and, during prediction (e.g., when the extension 140 is not operational), the identifier 210 may ignore training records for which the confidence level does not meet a minimum threshold (e.g., 50% confidence) of accuracy.

While the components and associated operations of the panelist meter 155 of FIG. 2 are described as operating as part of the panelist meter 155 in the media device 130 of FIG. 1, some or all of the components may be located in other places. For example, the panelist meter 155 may include only the data monitor 202 and may transmit the data to a parameter extractor 204 located at the central facility 170. In such an example, the parameter extractor 204, the browser extension data receiver 206, the data store interface 208, the identifier 210, and the data store 150 could be located at the central facility 170, such that the training process and identification process described herein could be performed at the central facility 170 based on data collected by the panelist meter 155 and/or other panelist meters of other devices. Additionally or alternatively, this disclosure is not limited to a particular allocation of components. Other location configurations are within the scope of this disclosure. In some examples, training data may be utilized only with the media device 130 from which the training data is collected. In other examples, training data may be shared among training devices (e.g., by performing identification using shared data at the central facility 170 and/or by distributing training data to other media devices 130). For example, training data may be shared among similar devices (e.g., devices of the same type (e.g., among laptops, among mobile devices, etc.), devices utilizing the same operating system, devices operated by user of the same demographic group, devices owned by the same user(s), etc.). Alternatively, the training data may not be shared in instances where the training data is confidential or not applicable to other devices (e.g., due to differences in network timing associated with particular devices).

FIG. 3 is a table 300 of example data that may be stored in the example data store 150 of FIG. 1. According to the example of FIG. 3, a URL identified by the extension 140 is stored in association with four example parameters (duration ("Time"), source hostname ("Source"), destination hostname ("Destination"), and packet size ("Size")) extracted by the parameter extractor 204 of FIG. 2. The example parameters are extracted from TCP data of communications between the media device 130 and three media providers 110. Example records 302, 304, and 306 are associated with Testurl1.com. In other words, the parameters in records 302, 304, and 306 were extracted from network communications that are associated with Testurl1.com (e.g., the network communications were received within +/−2 seconds of the extension 140 detecting access to Testurl1.com in the web browser 135). Example record 308 is associated with Testurl2.com. Example record 310 is associated with Testurl3.com. As illustrated in the example table 300 the source hostname and/or destination hostname may not be indicative of the actual URL of the media provider 110. For example, the source and/or destination hostname may identify a content delivery network that distributes media for many media providers 110.

While example manners of implementing the example panelist meter 155 are illustrated in FIGS. 1-2, one or more of the elements, processes and/or devices illustrated in FIGS. 1 and/or 2 may be combined, divided, re-arranged, omitted, eliminated and/or implemented in any other way. Further, the example media device 130, the example web browser 135, the example extension 140, the example data store 150, the example panelist meter 155, and/or the example central facility 140 of FIG. 1 and/or the example data monitor 202, the example parameter extractor 204, the example browser extension identifier 206, the example data store interface 208, and/or the example identifier 210 of FIG. 2 may be implemented by hardware, software, firmware and/or any combination of hardware, software and/or firmware. Thus, for example, any of the example media device 130, the example web browser 135, the example extension 140, the example data store 150, the example panelist meter 155, and/or the example central facility 140 of FIG. 1 and/or the example data monitor 202, the example parameter extractor 204, the example browser extension identifier 206, the example data store interface 208, and/or the example identifier 210 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media device 130, the example web browser 135, the example extension 140, the example data store 150, the example panelist meter 155, and/or the example central facility 140 of FIG. 1 and/or the example data monitor 202, the example parameter extractor 204, the example browser extension identifier 206, the example data store interface 208, and/or the example identifier 210 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example panelist meter 155 of FIG. 1 may include one or more elements, processes and/or devices in addition to, or instead of, those illustrated in FIGS. 1 and/or 2 may include more than one of any or all of the illustrated elements, processes and devices.

Figure 4:
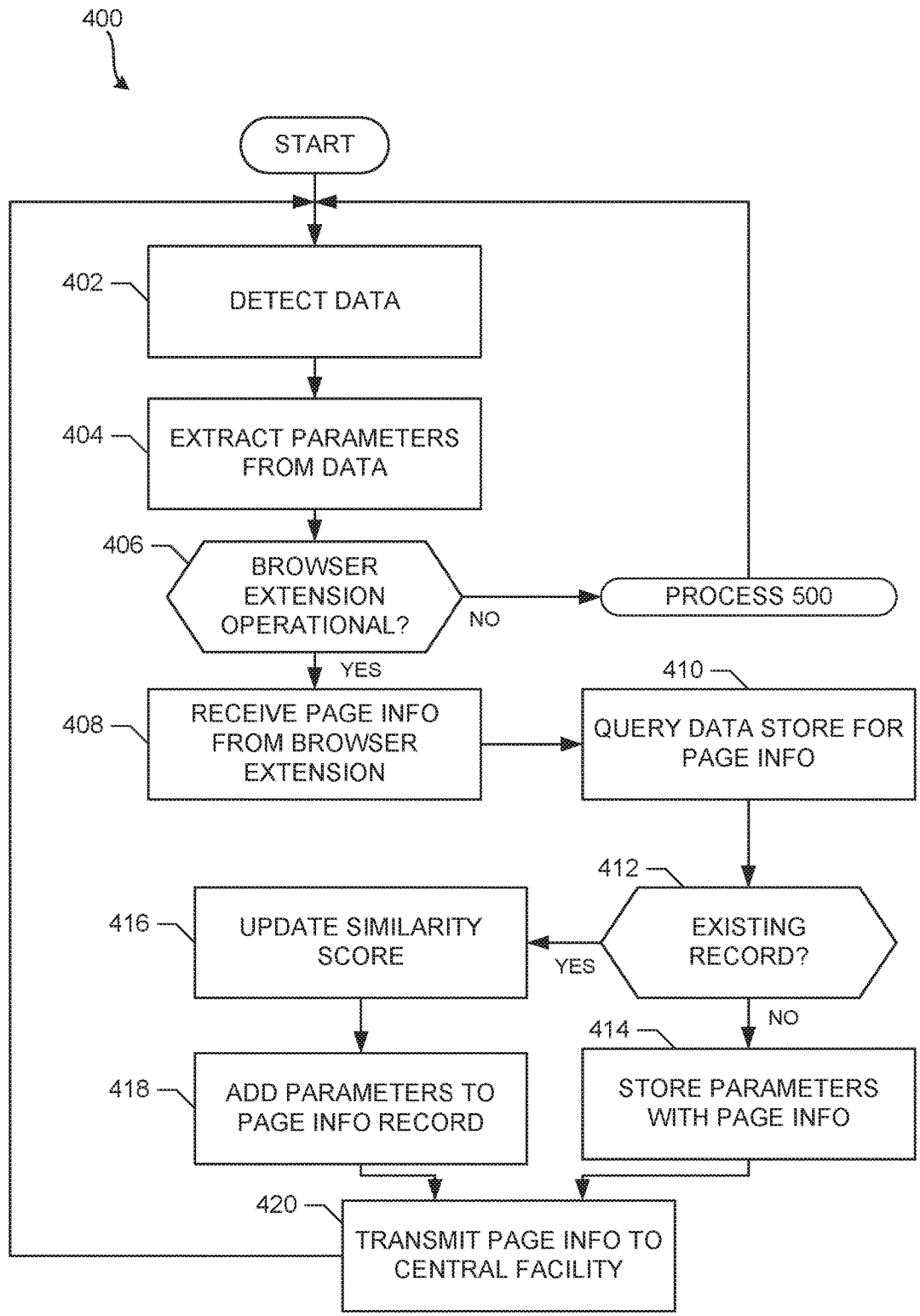
FIGS. 4 and 5 are a flowchart representative of example machine-readable instructions that may be executed to implement the example panelist meter of FIGS. 1 and/or 2.
Figure 5:
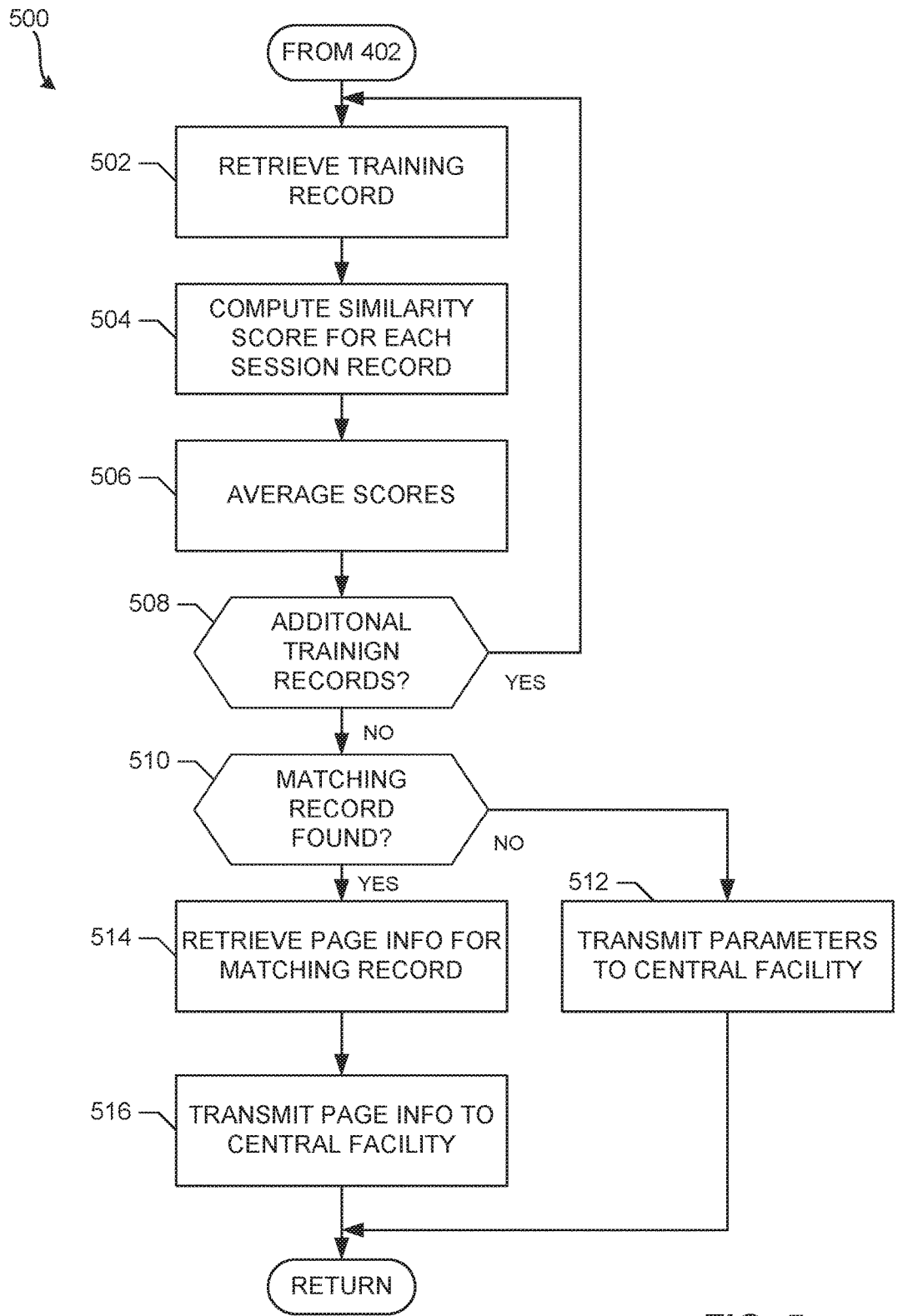

Flowcharts representative of example machine readable instructions for implementing the example panelist meter 155 of FIGS. 1 and/or 2 are shown in FIGS. 4-5. In these examples, the machine readable instructions comprise program(s) for execution by a processor such as the processor 612 shown in the example media device 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 4-5, many other methods of implementing the example panelist meter 155 may alternatively be used. For example, the order of execution of the blocks may be changed, and/or some of the blocks described may be changed, eliminated, or combined.

As mentioned above, the example processes of FIGS. 4-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process 400 of FIG. 4 begins when the data monitor 202 of the example panelist meter 155 of FIG. 2 detects network data (e.g., by sniffing the packet data transmitted to/from the web browser 135) (block 402). The example parameter extractor 204 extracts parameters from the identifying data (block 404). For example, the example parameter extractor 204 of FIG. 2 extracts a duration, a source hostname, a destination hostname, and a size. The example parameter extractor 204 then determines if the example extension 140 of the web browser 135 on the media device 130 of FIG. 1 is operational (block 406). When the extension 140 is not operational, the example process 400 proceeds to example process 500, which is discussed below in conjunction with FIG. 5.

When the extension 140 is operational (block 406), the browser extension data receiver 206 receives information from the extension 140 (block 408). According to the illustrated example, the browser extension data receiver 206 receives a URL extracted by the extension 140 from a web page that is being presented by the web browser 135. Alternatively, any other information provided by the extension 140 may be collected by the browser extension data receiver 206.

The data store interface 208 then queries the example data store 150 for the page information associated with the URL received from the extension 140 (block 410). The data store interface 208 determines if a training record exists for the URL (block 412). When a training record does not exist, the data store interface 208 creates a new training record for the URL and stores the parameters extracted at block 404 in a new session record for the training record (block 414).

When an existing training record exists for the URL (block 412), the example identifier 210 computes an updated similarity score (e.g., a confidence level) by determining the similarity of the parameters extracted in block 404 with the parameters contained in session records of the existing training record (block 416). The data store interface 208 then stores the similarity score and a new session record containing the parameters in the training record in the data store 150 (block 418).

After a new training record has been create in block 414 or an existing training record has been updated in block 418, the example data store interface 208 transmits page information to the central facility 170 to record the exposure to the web page presented by the web browser 135 (block 420). Alternatively, the data store interface 208 may store records until a threshold number of records have been collected or a duration of time has passed and transmit a plurality of page information records to the central facility.

After the page information has been transmitted to the central facility according to the example process 400, control returns to block 402 to await detection of data by the data monitor 202.

FIG. 5 is a flowchart of an example process 500 that may be performed when the extension 140 is determined to be inoperative at block 406 of FIG. 4. The process of FIG. 5 begins with the example identifier 210 retrieving a training record from the data store 150 via the data store interface 208 (block 502). The example identifier 210 then computes a similarity score for each parameter in the session records in the training record by comparing the parameters extracted in block 404 of FIG. 4 with the parameters stored in the session records (block 504). The example identifier 210 determines a first similarity score for the duration parameter (e.g., by comparing the duration parameter from the parameters from block 404 with the set of duration parameters in the session records included in the training record), a second similarity score for the source hostname parameter, a third similarity score for the destination hostname parameter, and a fourth similarity score for the size parameter. The identifier 210 then averages the similarity scores to determine a similarity score for the parameters from block 404 compared to the training record (block 506).

The data store interface 208 then determines if there are additional training records to be analyzed (block 508). When there are additional training records, control returns to block 502 to compute a similarity score for remaining training records.

When similarity scores have been determined for all training records (e.g., all training records that include a confidence level that exceeds a threshold) (block 508), the example identifier 210 determines if a matching training record has been found (block 510). For example, the matching training record may be determined to be the training record for which the best similarity score was determined. However, the similarity score may be compared with a threshold to determine if the best similarity score is sufficient to establish a match. When a match is not found, the identifier 210 causes the data store interface 208 to transmit the parameters from block 404 to the central facility 170 with an indication that a match could not be found (block 512). The central facility 170 may analyze the information to determine an identity (e.g., by comparing the parameters with training records received from other locations), may record an error notification, etc. Alternatively, the identifier 210 may cause the data store interface 208 to store the parameters from block 404 in the data store 150 for later transmission to the central facility 170 or the identifier 210 may skip the parameters from block 404 and await new data.

Returning to block 510, when the identifier 210 identifies a training record that is a sufficient match with the parameters from block 404, the identifier 210 causes the data store interface 208 to retrieve the page information (e.g., URL) associated with the matching training record (block 514). The data store interface 208 then transmits the page information to the central facility 170 to record the exposure to the web page presented by the web browser 135 (block 516). Alternatively, the data store interface 208 may store records until a threshold number of records have been collected or a duration of time has passed and transmit a plurality of page information records to the central facility.

Example machine readable instructions to compute similarity scores for example data are attached as an appendix are incorporated in this disclosure. The example machine readable instructions are written in the Ruby programming language. However, machine readable instructions as disclosed herein may be written in any one or more programming language. The example data analyzed by the example machine readable instructions are also attached.

Figure 6:
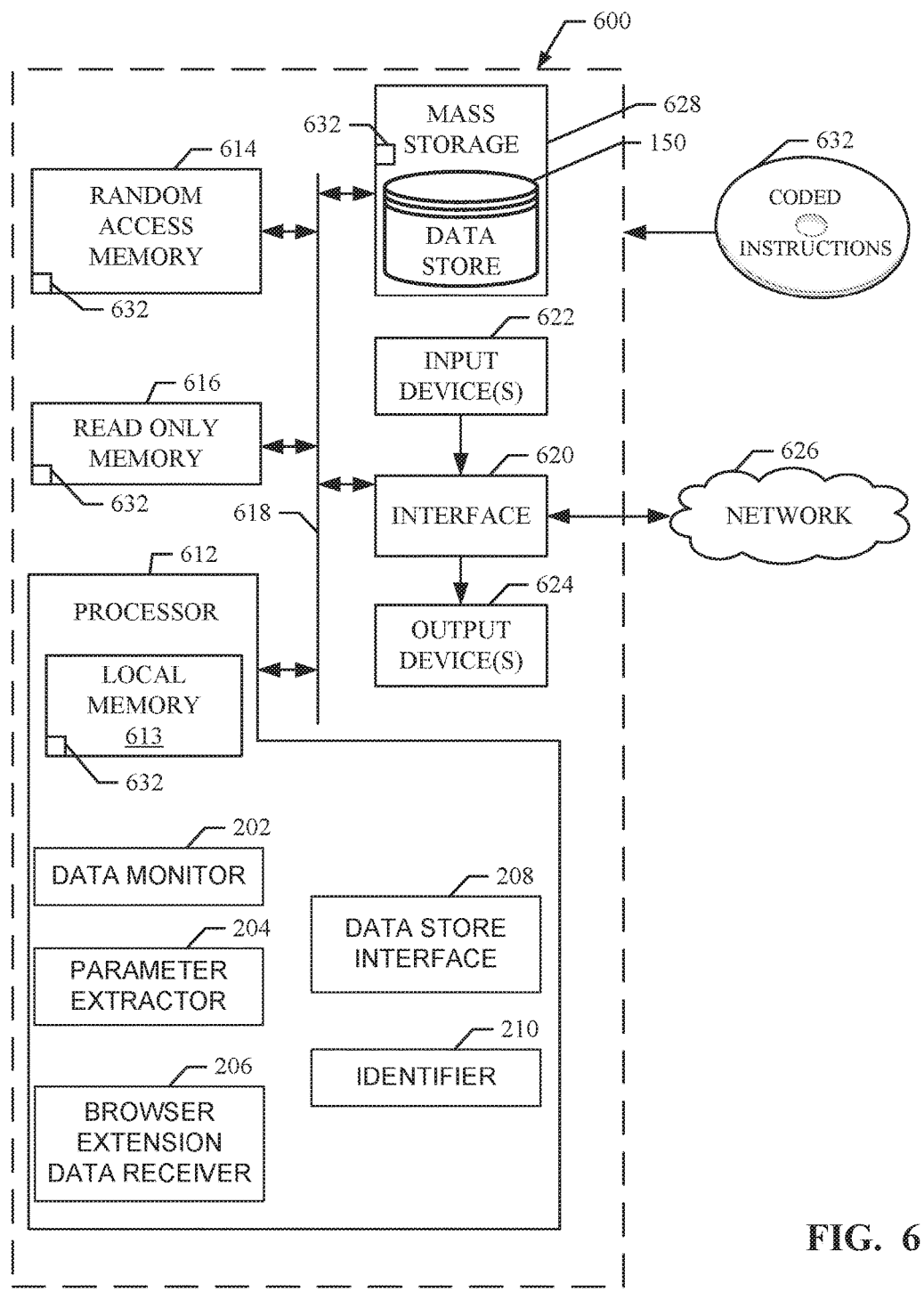
FIG. 6 is a block diagram of an example processor platform structured to execute the example machine-readable instructions of FIG. 4 to implement the example panelist meter of FIGS. 1 and/or 2.

FIG. 6 is a block diagram of an example consumer media device 600 structured to execute the instructions of FIGS. 4-5 to implement the example panelist meter 155 of FIGS. 1 and/or 2. The media device 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The media device 600 of the illustrated example includes a processor 612. The processor 612 of the illustrated example is silicon-based hardware. For example, the processor 612 can be implemented by one or more integrated circuits, logic circuits, microprocessors or controllers from any desired family or manufacturer.

The processor 612 of the illustrated example includes a local memory 613 (e.g., a cache). The example processor 612 of FIG. 6 executes the instructions of FIGS. 4 and/or 5 to implement the example data monitor 202, the example parameter extractor 204, the example browser extension data receiver 206, the example data store interface 208, and the example identifier 202 of FIG. 2. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The media device 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The media device 600 of the illustrated example also includes one or more mass storage devices 628 for storing software and/or data. The example mass storage device 628 includes the data store 150. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5 may be stored in the mass storage device 628, in the volatile memory 614, in the non-volatile memory 616, and/or on a removable tangible computer readable storage medium such as a CD or DVD.

Example systems disclosed herein enable monitoring of, for example, online media. In some examples, media that is encrypted (e.g., media communicated via HTTPS) may be monitored when a panelist meter is not able to access the decrypted media (e.g., when a browser extension is not available) and/or the encryption prevents a panelist meter from accessing the payload of encrypted media packets. In disclosed examples, this monitoring is accomplished by extracting parameters from the packets carrying the encrypted data and comparing the parameters against reference records of parameters (e.g., parameters extracted when a browser extension is operative and gathering identifying information). Because reference parameters are collected at the media device at which the reference parameters will later be analyzed, the accuracy of the system is improved (as compared with distributing reference parameters from a central facility to a plurality of media devices). Improved accuracy may be obtained by utilized parameters that reflect the local experience of the affected media device (e.g., the media device 130 of FIG. 1). Furthermore, because the disclosed system is capable of identifying encrypted media even when a browser extension has failed (e.g., after a browser update), identifying information can be determined and media exposure can be credited where no crediting would have occurred in prior systems (e.g., because prior systems could not identify the source of encrypted media for crediting). In some examples, after sufficient identifying information and records have been collected using the browser extension, the extension could be disabled and identification could be performed utilizing the collected records, thus eliminating utilization of the computing resources (e.g., processing resources, memory resources, etc.) consumed by the browser extension. Thus, disclosed examples overcome the problem associated with extensions for monitoring media being disabled (e.g., by a software update to a browser).

The example instructions included in the appendix may be utilized to implement the components of the panelist meter 155. In the appendix, traffic-analysis.rb is an example implementation of the example data monitor 202 of FIG. 2 (receiving tcpdump session data), the example parameter extractor 204 (parsing the tcpdump data), the example identifier 210 (determining Jaccard coefficient similarity scores), and the example data store interface 208 (storing parameters and similarity scores for training data). The comparer.rb is an example implementation of the example data monitor 202 of FIG. 2 (receiving tcpdump session data), the example parameter extractor 204 (parsing the tcpdump data), the example identifier 210 (determining Jaccard coefficient similarity scores to identify the media), and the example data store interface 208 (storing parameters and similarity scores for training data). The example tcpdump-filter.rb is an example implementation of the parameter extractor 204 of FIG. 2 (parsing tcpdump data and extracting relevant parameters). facebook-tcp-filtered.txt, gmail-tcp-filtered.txt, and youtube-tcp-filtered.txt are example listings of parameter data that may be collected by the example data monitor 202 and/or extracted by the example parameter extractor 204 of FIG. 2.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

APPENDIX

Sample Code and TCP data files traffic-analysis.rb

```ruby
! /usr/bin/ruby require 'rubygems'
require 'jaccard'
require 'pp'
require 'set'

# Class to store the URL string and an array of SessionSets for that URL
class TrainingObject < Hash

# Given a URL, sets up a new training instance for it
  def initialize( url="" )
    super
    self[:url] = url
    self[:sets] = Array.new
  end

# Loads a tcpdump session from disk, parses the CSV format, and adds each lines parts to
  # the right set types
  def addSessionWithPath( path )
    set = SessionSet.new( path)
    self[:sets] << set
  end

# For each training session, generates an average Jaccard coefficient for each datapoint set
  # against the given sample session
  # Then returns the overall average across all sessions
  def compareToSession( sample )
    total_score = 0.0
    self[:sets].each do | set |
      time_score = Jaccard.coefficient( sample[:times], set[:times] )
```

```ruby
    src_score = Jaccard.coefficient( sample[:srcs], set[:srcs] )
    dst_score = Jaccard.coefficient( sample[:dsts], set[:dsts] )
    length_score = Jaccard.coefficient( sample[:lengths], set[:lengths] )
    avg_score = ( time_score + src_score + dst_score + length_score ) / 4
    total_score = total_score + avg_score
  end
  total_score = total_score / self[:sets].count
 end end

Class with 4 sets for the 4 TCP packet datapoints we care about
class SessionSet < Hash

# If a path is given, fills in the sets at init time
 def initialize( path="")
  super
  self[:times] = Set.new
  self[:srcs] = Set.new
  self[:dsts] = Set.new
  self[:lengths] = Set.new

# Loads the text file at the given path, breaks each line apart on commas, and fills in the associated sets for each field
  if path != ""
   session = ""
   File.open(path, "r") { |f| session << f.read} split_session = Array.new
   session.each do | line |
    split_session << line.split(",")
   end
```

```
    split_session.each do | fields |
      self[:times] << fields[0]
      self[:srcs] << fields[1]
      self[:dsts] << fields[2]
      self[:lengths] << fields[3]
    end
  end
end end
``` comparer.rb

```ruby
! /usr/bin/ruby require 'rubygems'
require 'jaccard'
require 'pp'
require 'set'

# Required argument is the path to the session to compare against
# This will end up as the candidate SessionSet instance
if ARGV[0]
    @testPath = ARGV[0]
else
    puts "You need to give a path to a filtered TCP session"
  return 1
end

# Class to store the URL string and an array of SessionSets for that URL
class TrainingObject < Hash

# Given a URL, sets up a new training instance for it
  def initialize( url="" )
    super
    self[:url] = url
    self[:sets] = Array.new
  end

# Loads a tcpdump session from disk, parses the CSV format, and adds each lines parts to the right set types
  def addSessionWithPath( path )
    set = SessionSet.new( path)
    self[:sets] << set
  end
```

```
# For each training session, generates an average Jaccard coefficient for each datapoint set
against the given sample session
# Then returns the overall average across all sessions
def compareToSession( sample )
  total_score = 0.0
  self[:sets].each do | set |
    time_score = Jaccard.coefficient( sample[:times], set[:times] )
    src_score = Jaccard.coefficient( sample[:srcs], set[:srcs] )
    dst_score = Jaccard.coefficient( sample[:dsts], set[:dsts] )
    length_score = Jaccard.coefficient( sample[:lengths], set[:lengths] )
    avg_score = ( time_score + src_score + dst_score + length_score ) / 4
    total_score = total_score + avg_score
  end
  total_score = total_score / self[:sets].count
end end

Class with 4 sets for the 4 TCP packet datapoints we care about
class SessionSet < Hash

# If a path is given, fills in the sets at init time
  def initialize( path="")
    super
    self[:times] = Set.new
    self[:srcs] = Set.new
    self[:dsts] = Set.new
    self[:lengths] = Set.new

# Loads the text file at the given path, breaks each line apart on commas, and fills in the
    associated sets for each field
    if path != ""
```

```
    session = ""
    File.open(path, "r") { |f| session << f.read} split_session = Array.new
    session.each do | line |
      split_session << line.split(",")
    end split_session.each do | fields |
      self[:times] << fields[0]
      self[:srcs] << fields[1]
      self[:dsts] << fields[2]
      self[:lengths] << fields[3]
    end
   end
  end end

Sets up the empty training objects
@facebook_training = TrainingObject.new( "https://www.facebook.com" )
@youtube_training = TrainingObject.new( "https://www.youtube.com/" )
@gmail_training = TrainingObject.new(
"https://accounts.google.com/ServiceLogin?service=mail&passive=true&rm=false
&continue=https://mail.google.com/mail/&ss=1&scc=1&ltmpl=default&
amp;ltmplcache=2" )

# Loads the training sessions into the training objects as SessionSets
@facebook_path = "facebook-tcp-filtered.txt"
@youtube_path = "youtube-tcp-filtered.txt"
@gmail_path = "gmail-tcp-filtered.txt"
@facebook_training.addSessionWithPath( @facebook_path )
@youtube_training.addSessionWithPath( @youtube_path )
```

```
@gmail_training.addSessionWithPath( @gmail_path )

# Load the session to compare against into a SessionSet
candidate = SessionSet.new( @testPath )

# Reports the similarity scores
puts "Against youtube: " + @youtube_training.compareToSession( candidate ).to_s
puts "Against facebook: " + @facebook_training.compareToSession( candidate ).to_s
puts "Against gmail: " + @gmail_training.compareToSession( candidate ).to_s
``` tcpdump-filter.rb

```ruby
! /usr/bin/ruby

@log = ""

if ARGV[0]
        @logPath = ARGV[0]
else
        puts "You need to give a path"
 return 1
end File.open(@logPath, "r") { |f| @log = f.read} outputs = []
output_index = 0
@log.each_line.with_index do |line, i|
  columns = line.split(' ')
  if i % 2 != 1
    # Odd lines look like this:
    # 18:41:05.859142 IP (tos 0x0, ttl 64, id 42661, offset 0, flags [DF], proto TCP (6), length 64, bad cksum 0 (->ac61)!)
    # We want:
    # 18:41:05.859142
    output = { :time => columns[0] }
    outputs.push( output )
  else
    # Even lines look like this:
    # 10.45.203.108.49592 > edge-star-ecmp-12-frc1.facebook.com.https: Flags [S], cksum 0xe7e3 (incorrect -> 0x2419), seq 1929094265, win 65535, options [mss 1460,nop,wscale 4,nop,nop,TS val 223429370 ecr 0,sackOK,eol], length 0
    # We want:
    # 10.45.203.108.49592 edge-star-ecmp-12-frc1.facebook.com.https 0
```

```
    output = outputs[output_index]
    output[:src] = columns[0]
    output[:dst] = columns[2]
    output[:length] = columns[columns.count-1]
    outputs[output_index] = output
    output_index = output_index + 1
  end end

Change times to microsecond deltas
time = outputs[0][:time]
time_components = time.split(":")
last_time = time_components[2].to_f outputs.each do |output|
  time = output[:time]
  time_components = time.split(":")
  secs = time_components[2].to_f
  delta = (secs - last_time) * 1000000
  delta = delta.truncate()
  last_time = secs
  output[:time] = delta.to_s
end

# Print a CSV list of times, sources, destinations, and packet lengths
outputs.each do | output|
  puts output[:time] + "," + output[:src] + "," + output[:dst] + "," + output[:length]
end
```

*facebook-tcp-filtered.txt*

0,10.45.203.108.49592,edge-star-ecmp-12-frc1.facebook.com.https:,0
44732,edge-star-ecmp-12-frc1.facebook.com.https,10.45.203.108.49592:,0
122,10.45.203.108.49592,edge-star-ecmp-12-frc1.facebook.com.https:,0
985,10.45.203.108.49592,edge-star-ecmp-12-frc1.facebook.com.https:,175
44804,edge-star-ecmp-12-frc1.facebook.com.https,10.45.203.108.49592:,0
488,edge-star-ecmp-12-frc1.facebook.com.https,10.45.203.108.49592:,133
178,10.45.203.108.49592,edge-star-ecmp-12-frc1.facebook.com.https:,0
202,10.45.203.108.49592,edge-star-ecmp-12-frc1.facebook.com.https:,6
5,10.45.203.108.49592,edge-star-ecmp-12-frc1.facebook.com.https:,41
49,10.45.203.108.49592,edge-star-ecmp-12-frc1.facebook.com.https:,499
44849,edge-star-ecmp-12-frc1.facebook.com.https,10.45.203.108.49592:,0
5,edge-star-ecmp-12-frc1.facebook.com.https,10.45.203.108.49592:,0
3,edge-star-ecmp-12-frc1.facebook.com.https,10.45.203.108.49592:,0
96248,edge-star-ecmp-12-frc1.facebook.com.https,10.45.203.108.49592:,1448
4,edge-star-ecmp-12-frc1.facebook.com.https,10.45.203.108.49592:,107
3,edge-star-ecmp-12-frc1.facebook.com.https,10.45.203.108.49592:,1448
33,edge-star-ecmp-12-frc1.facebook.com.https,10.45.203.108.49592:,1149
94,10.45.203.108.49592,edge-star-ecmp-12-frc1.facebook.com.https:,0
5,10.45.203.108.49592,edge-star-ecmp-12-frc1.facebook.com.https:,0
33,edge-star-ecmp-12-frc1.facebook.com.https,10.45.203.108.49592:,1448
77,10.45.203.108.49592,edge-star-ecmp-12-frc1.facebook.com.https:,0
66,edge-star-ecmp-12-frc1.facebook.com.https,10.45.203.108.49592:,1448
2,edge-star-ecmp-12-frc1.facebook.com.https,10.45.203.108.49592:,297
59,10.45.203.108.49592,edge-star-ecmp-12-frc1.facebook.com.https:,0
59,edge-star-ecmp-12-frc1.facebook.com.https,10.45.203.108.49592:,1448
125,edge-star-ecmp-12-frc1.facebook.com.https,10.45.203.108.49592:,1448
89,10.45.203.108.49592,edge-star-ecmp-12-frc1.facebook.com.https:,0
37,edge-star-ecmp-12-frc1.facebook.com.https,10.45.203.108.49592:,1448
246,10.45.203.108.49592,edge-star-ecmp-12-frc1.facebook.com.https:,0
44259,edge-star-ecmp-12-frc1.facebook.com.https,10.45.203.108.49592:,1342
337,10.45.203.108.49592,edge-star-ecmp-12-frc1.facebook.com.https:,0
29068,10.45.203.108.49594,a65-32-34-73.deploy.akamaitechnologies.com.https:,0

4,10.45.203.108.49593,a65-32-34-73.deploy.akamaitechnologies.com.https:,0
3504,10.45.203.108.49595,a65-32-34-73.deploy.akamaitechnologies.com.https:,0
86,a65-32-34-73.deploy.akamaitechnologies.com.https,10.45.203.108.49594:,0
103,a65-32-34-73.deploy.akamaitechnologies.com.https,10.45.203.108.49593:,0
5,10.45.203.108.49594,a65-32-34-73.deploy.akamaitechnologies.com.https:,0
35,10.45.203.108.49593,a65-32-34-73.deploy.akamaitechnologies.com.https:,0
3247,10.45.203.108.49594,a65-32-34-73.deploy.akamaitechnologies.com.https:,150
70,a65-32-34-73.deploy.akamaitechnologies.com.https,10.45.203.108.49595:,0
40,10.45.203.108.49595,a65-32-34-73.deploy.akamaitechnologies.com.https:,0
543,10.45.203.108.49593,a65-32-34-73.deploy.akamaitechnologies.com.https:,150
646,10.45.203.108.49595,a65-32-34-73.deploy.akamaitechnologies.com.https:,150
2186,a65-32-34-73.deploy.akamaitechnologies.com.https,10.45.203.108.49594:,0
504,a65-32-34-73.deploy.akamaitechnologies.com.https,10.45.203.108.49594:,1000
227,10.45.203.108.49594,a65-32-34-73.deploy.akamaitechnologies.com.https:,0
14,a65-32-34-73.deploy.akamaitechnologies.com.https,10.45.203.108.49593:,0 gmail-tcp-filtered.txt 0,10.45.203.108.49598,a65-32-34-73.deploy.akamaitechnologies.com.https:,37
16,10.45.203.108.49598,a65-32-34-73.deploy.akamaitechnologies.com.https:,0
377,10.45.203.108.49597,a65-32-34-73.deploy.akamaitechnologies.com.https:,37
21,10.45.203.108.49597,a65-32-34-73.deploy.akamaitechnologies.com.https:,0
315,10.45.203.108.49596,a65-32-34-73.deploy.akamaitechnologies.com.https:,37
15,10.45.203.108.49596,a65-32-34-73.deploy.akamaitechnologies.com.https:,0
255,10.45.203.108.49594,a65-32-34-73.deploy.akamaitechnologies.com.https:,37
11,10.45.203.108.49594,a65-32-34-73.deploy.akamaitechnologies.com.https:,0
741,10.45.203.108.49593,a65-32-34-73.deploy.akamaitechnologies.com.https:,37
81,10.45.203.108.49593,a65-32-34-73.deploy.akamaitechnologies.com.https:,0
477,10.45.203.108.49595,a65-32-34-73.deploy.akamaitechnologies.com.https:,37
41,10.45.203.108.49595,a65-32-34-73.deploy.akamaitechnologies.com.https:,0
358,10.45.203.108.49592,edge-star-ecmp-12-frc1.facebook.com.https:,27
39,10.45.203.108.49592,edge-star-ecmp-12-frc1.facebook.com.https:,0
1153,a65-32-34-73.deploy.akamaitechnologies.com.https,10.45.203.108.49597:,37
4,a65-32-34-73.deploy.akamaitechnologies.com.https,10.45.203.108.49597:,0
47,10.45.203.108.49597,a65-32-34-73.deploy.akamaitechnologies.com.https:,0
3,10.45.203.108.49597,a65-32-34-73.deploy.akamaitechnologies.com.https:,0
212,a65-32-34-73.deploy.akamaitechnologies.com.https,10.45.203.108.49596:,37
2,a65-32-34-73.deploy.akamaitechnologies.com.https,10.45.203.108.49596:,0
23,10.45.203.108.49596,a65-32-34-73.deploy.akamaitechnologies.com.https:,0
3,10.45.203.108.49596,a65-32-34-73.deploy.akamaitechnologies.com.https:,0
499,a65-32-34-73.deploy.akamaitechnologies.com.https,10.45.203.108.49598:,37
3,a65-32-34-73.deploy.akamaitechnologies.com.https,10.45.203.108.49598:,0
23,10.45.203.108.49598,a65-32-34-73.deploy.akamaitechnologies.com.https:,0
3,10.45.203.108.49598,a65-32-34-73.deploy.akamaitechnologies.com.https:,0
326,a65-32-34-73.deploy.akamaitechnologies.com.https,10.45.203.108.49594:,37
3,a65-32-34-73.deploy.akamaitechnologies.com.https,10.45.203.108.49594:,0
97,10.45.203.108.49594,a65-32-34-73.deploy.akamaitechnologies.com.https:,0
7,10.45.203.108.49594,a65-32-34-73.deploy.akamaitechnologies.com.https:,0
1322,a65-32-34-73.deploy.akamaitechnologies.com.https,10.45.203.108.49593:,37
4,a65-32-34-73.deploy.akamaitechnologies.com.https,10.45.203.108.49593:,0

188,10.45.203.108.49593,a65-32-34-73.deploy.akamaitechnologies.com.https:,0
9,10.45.203.108.49593,a65-32-34-73.deploy.akamaitechnologies.com.https:,0
318,a65-32-34-73.deploy.akamaitechnologies.com.https,10.45.203.108.49595:,37
3,a65-32-34-73.deploy.akamaitechnologies.com.https,10.45.203.108.49595:,0
104,10.45.203.108.49595,a65-32-34-73.deploy.akamaitechnologies.com.https:,0
8,10.45.203.108.49595,a65-32-34-73.deploy.akamaitechnologies.com.https:,0
40283,edge-star-ecmp-12-frc1.facebook.com.https,10.45.203.108.49592:,0
3,edge-star-ecmp-12-frc1.facebook.com.https,10.45.203.108.49592:,0
3,edge-star-ecmp-12-frc1.facebook.com.https,10.45.203.108.49592:,27
2,edge-star-ecmp-12-frc1.facebook.com.https,10.45.203.108.49592:,0
152,10.45.203.108.49592,edge-star-ecmp-12-frc1.facebook.com.https:,0
4,10.45.203.108.49592,edge-star-ecmp-12-frc1.facebook.com.https:,0
2,10.45.203.108.49592,edge-star-ecmp-12-frc1.facebook.com.https:,0
2,10.45.203.108.49592,edge-star-ecmp-12-frc1.facebook.com.https:,0
44853,edge-star-ecmp-12-frc1.facebook.com.https,10.45.203.108.49592:,0

*youtube-tcp-filtered.txt*

0,10.45.203.108.49605,mia05s17-in-f28.1e100.net.https:,0
3,10.45.203.108.49606,mia05s17-in-f28.1e100.net.https:,0
32750,mia05s17-in-f28.1e100.net.https,10.45.203.108.49605:,0
109,mia05s17-in-f28.1e100.net.https,10.45.203.108.49606:,0
22,10.45.203.108.49605,mia05s17-in-f28.1e100.net.https:,0
13,10.45.203.108.49606,mia05s17-in-f28.1e100.net.https:,0
1091,10.45.203.108.49605,mia05s17-in-f28.1e100.net.https:,147
848,10.45.203.108.49606,mia05s17-in-f28.1e100.net.https:,147
26332,10.45.203.108.49607,ye-in-f84.1e100.net.https:,0
5428,mia05s17-in-f28.1e100.net.https,10.45.203.108.49605:,0
796,mia05s17-in-f28.1e100.net.https,10.45.203.108.49606:,0
872,mia05s17-in-f28.1e100.net.https,10.45.203.108.49605:,1418
16,mia05s17-in-f28.1e100.net.https,10.45.203.108.49605:,733
90,10.45.203.108.49605,mia05s17-in-f28.1e100.net.https:,0
242,mia05s17-in-f28.1e100.net.https,10.45.203.108.49606:,1418
69,mia05s17-in-f28.1e100.net.https,10.45.203.108.49606:,733
33,10.45.203.108.49606,mia05s17-in-f28.1e100.net.https:,0
55255,ye-in-f84.1e100.net.https,10.45.203.108.49607:,0
45,10.45.203.108.49607,ye-in-f84.1e100.net.https:,0
3315,10.45.203.108.49605,mia05s17-in-f28.1e100.net.https:,75
5,10.45.203.108.49605,mia05s17-in-f28.1e100.net.https:,6
2,10.45.203.108.49605,mia05s17-in-f28.1e100.net.https:,41
948,10.45.203.108.49607,ye-in-f84.1e100.net.https:,146
10106,10.45.203.108.49606,mia05s17-in-f28.1e100.net.https:,75
6,10.45.203.108.49606,mia05s17-in-f28.1e100.net.https:,6
4,10.45.203.108.49606,mia05s17-in-f28.1e100.net.https:,41
22074,mia05s17-in-f28.1e100.net.https,10.45.203.108.49605:,0
88,mia05s17-in-f28.1e100.net.https,10.45.203.108.49605:,47
34,10.45.203.108.49605,mia05s17-in-f28.1e100.net.https:,0
211,10.45.203.108.49605,mia05s17-in-f28.1e100.net.https:,549
11153,mia05s17-in-f28.1e100.net.https,10.45.203.108.49606:,0

62,mia05s17-in-f28.1e100.net.https,10.45.203.108.49606:,47
45,10.45.203.108.49606,mia05s17-in-f28.1e100.net.https:,0
284,10.45.203.108.49606,mia05s17-in-f28.1e100.net.https:,525
18571,ye-in-f84.1e100.net.https,10.45.203.108.49607:,0
1227,ye-in-f84.1e100.net.https,10.45.203.108.49607:,1418
3,ye-in-f84.1e100.net.https,10.45.203.108.49607:,517
92,10.45.203.108.49607,ye-in-f84.1e100.net.https:,0
30231,10.45.203.108.49607,ye-in-f84.1e100.net.https:,75
13,10.45.203.108.49607,ye-in-f84.1e100.net.https:,6
6,10.45.203.108.49607,ye-in-f84.1e100.net.https:,41
15609,mia05s17-in-f28.1e100.net.https,10.45.203.108.49605:,0
11676,mia05s17-in-f28.1e100.net.https,10.45.203.108.49606:,0
34993,mia05s17-in-f28.1e100.net.https,10.45.203.108.49605:,1350
107,mia05s17-in-f28.1e100.net.https,10.45.203.108.49605:,1350
7,10.45.203.108.49605,mia05s17-in-f28.1e100.net.https:,0
40,10.45.203.108.49605,mia05s17-in-f28.1e100.net.https:,0
71,mia05s17-in-f28.1e100.net.https,10.45.203.108.49605:,1350

What is claimed is:

1. A method for monitoring a media device, the method comprising:
    extracting, by executing an instruction with a processor, first network packet parameters from a first network packet received at a media device when retrieving a first encrypted web page;
    storing the first network packet parameters in association with identifying information for the first encrypted web page, the identifying information collected by an extension in a web browser at the media device;
    extracting, by executing an instruction with the processor, second network packet parameters from a second network packet received at the media device from an unknown encrypted web page;
    when the extension does not collect identifying information for the unknown encrypted web page, comparing, by executing an instruction with the processor, the second network packet parameters to the first network packet parameters; and
    identifying, by executing an instruction with the processor, the unknown encrypted web page as the first encrypted web page when the comparison of the second network packet parameters to the first network packet parameters has a similarity above a threshold.

2. The method as defined in claim 1, wherein the extension does not collect identifying information because the extension is inoperative.

3. The method as defined in claim 2, further including detecting that the extension is inoperative.

4. The method as defined in claim 2, wherein the extension is inoperative when the extension is unable to determine identifying information associated with the unknown encrypted web page.

5. The method as defined in claim 1, wherein comparing the second network packet parameters to the first network packet parameters includes:
    determining a set of similarities for the parameters in the second network packet parameters; and
    determining the similarity as an average of the set of similarities.

6. The method as defined in claim 1, wherein the network packet parameters include at least one of a duration, a source hostname, a destination hostname, and a size.

7. The method as defined in claim 1, wherein the identifying information is a uniform resource locator.

8. An apparatus for monitoring a media device, the apparatus comprising:
    a parameter extractor to extract first network packet parameters from a first network packet received at a media device when retrieving a first encrypted web page, store the first network packet parameters in association with identifying information for the first encrypted web page, the identifying information collected by an extension in a web browser at the media device, and extract second network packet parameters from a second network packet received at the media device from an unknown encrypted web page; and
    an identifier to, when the extension does not collect identifying information for the unknown encrypted web page, compare the second network packet parameters to the first network packet parameters and identify the unknown encrypted web page as the first encrypted web page when the comparison of the second network packet parameters to the first network packet parameters has a similarity above a threshold.

9. The apparatus as defined in claim 8, wherein the extension does not collect identifying information because the extension is inoperative.

10. The apparatus as defined in claim 9, further including a browser extension data receiver to detect that the extension is inoperative.

11. The apparatus as defined in claim 9, wherein the extension is inoperative when the extension is unable to determine identifying information associated with the unknown encrypted web page.

12. The apparatus as defined in claim 8, wherein identifier is to compare the second network packet parameters to the first network packet parameters by:
    determining a set of similarities for the parameters in the second network packet parameters; and
    determining the similarity as an average of the set of similarities.

13. The apparatus as defined in claim 8, wherein the network packet parameters include at least one of a duration, a source hostname, a destination hostname, and a size.

14. The apparatus as defined in claim 8, wherein the identifying information is a uniform resource locator.

15. A non-transitory computer readable medium comprising instructions that, when executed, cause a machine to at least:
    extract first network packet parameters from a first network packet received at a media device when retrieving a first encrypted web page;
    store the first network packet parameters in association with identifying information for the first encrypted web page, the identifying information collected by an extension in a web browser at the media device;
    extract second network packet parameters from a second network packet received at the media device from an unknown encrypted web page;
    when the extension does not collect identifying information for the unknown encrypted web page, compare the second network packet parameters to the first network packet parameters; and
    identify the unknown encrypted web page as the first encrypted web page when the comparison of the second network packet parameters to the first network packet parameters has a similarity above a threshold.

16. The non-transitory computer readable medium as defined in claim 15, wherein the extension does not collect identifying information because the extension is inoperative.

17. The non-transitory computer readable medium as defined in claim 16, wherein the instructions, when executed, cause the machine to detect that the extension is inoperative.

18. The non-transitory computer readable medium as defined in claim 16, wherein the extension is inoperative when the extension is unable to determine identifying information associated with the unknown encrypted web page.

19. The non-transitory computer readable medium as defined in claim 15, wherein the instructions, when executed, cause the machine to compare the second network packet parameters to the first network packet parameters by:
    determining a set of similarities for the parameters in the second network packet parameters; and
    determining the similarity as an average of the set of similarities.

20. The non-transitory computer readable medium as defined in claim 15, wherein the network packet parameters include at least one of a duration, a source hostname, a destination hostname, and a size.

21. The non-transitory computer readable medium as defined in claim 15, wherein the identifying information is a uniform resource locator.

\* \* \* \* \*